United States Patent
Ortega Avila et al.

(10) Patent No.: US 12,496,493 B2
(45) Date of Patent: Dec. 16, 2025

(54) SYSTEMS AND METHOD FOR SEGMENTATION OF MOVEMENT REPETITIONS AND EXTRACTION OF PERFORMANCE METRICS

(71) Applicant: Samsung Electronics Company, Ltd., Suwon Si (KR)

(72) Inventors: Santiago Ortega Avila, Milpitas, CA (US); Cathy Kim, Palo Alto, CA (US); Marc Estruch Tena, San Jose, CA (US); John Novak, Santa Clara, CA (US); Tara Sriram, Sunnyvale, CA (US); Vishnu Venugopal, Sunnyvale, CA (US); Mohammad J. Abu Saude, Sunnyvale, CA (US); Imran Mohammed, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 194 days.

(21) Appl. No.: 17/700,269

(22) Filed: Mar. 21, 2022

(65) Prior Publication Data

US 2023/0293941 A1    Sep. 21, 2023

(51) Int. Cl.
*A63B 24/00* (2006.01)
*G06F 3/0484* (2022.01)

(52) U.S. Cl.
CPC ........ *A63B 24/0062* (2013.01); *G06F 3/0484* (2013.01); *A63B 2220/17* (2013.01);
(Continued)

(58) Field of Classification Search
CPC ................................. A63B 24/0062
See application file for complete search history.

(56) References Cited

U.S. PATENT DOCUMENTS

| 9,174,084 B2 | 11/2015 | Morris |
| 10,751,571 B2 * | 8/2020 | Lee ......................... G01S 19/19 |

(Continued)

FOREIGN PATENT DOCUMENTS

| KR | 10-1604024 | 3/2016 |
| KR | 2049506 | 11/2019 |

(Continued)

OTHER PUBLICATIONS

PCT Search Report and Written Opinion in Application No. PCT/KR2023/003477, Jun. 20, 2023.

(Continued)

*Primary Examiner* — Jay Trent Liddle

(57) ABSTRACT

In one embodiment, a method includes, by an electronic device, receiving a digital input indicating a type of movement. Streaming sensor data corresponding to movements of a first user can be accessed from one or more sensors of one or more wearable devices on the first user. Displacement data corresponding to the movements of the first user can be generated based on the streaming sensor data and the indicated type of movement. One or more repetitions represented in one or more corresponding segments of the displacement data can be identified based on the displacement data. The displacement data corresponding to each identified repetition may substantially match a predetermined movement signature associated with the type of movement. One or more performance metrics can be calculated for one or more of the identified repetitions. Instructions can be provided for presenting a user interface including information referencing the performance metrics.

20 Claims, 6 Drawing Sheets

(52) U.S. Cl.
CPC ....... *A63B 2220/40* (2013.01); *A63B 2220/62* (2013.01); *A63B 2220/836* (2013.01); *A63B 2220/89* (2013.01); *A63B 2225/02* (2013.01)

(56) References Cited

U.S. PATENT DOCUMENTS

| | | | |
|---|---|---|---|
| 11,065,527 B2 | 7/2021 | Putnam | |
| 11,284,807 B2* | 3/2022 | Hapola | G01P 15/0802 |
| 11,504,580 B2 | 11/2022 | Hong | |
| 2008/0090703 A1* | 4/2008 | Rosenberg | A63B 24/00 482/8 |
| 2010/0009810 A1* | 1/2010 | Trzecieski | G16H 20/30 482/8 |
| 2010/0204952 A1* | 8/2010 | Irlam | A61B 5/681 702/141 |
| 2011/0092337 A1* | 4/2011 | Srinivasan | A63B 24/0006 482/8 |
| 2013/0162427 A1* | 6/2013 | Dibenedetto | A44B 18/00 340/539.12 |
| 2013/0190903 A1* | 7/2013 | Balakrishnan | A63B 71/06 700/91 |
| 2014/0257533 A1* | 9/2014 | Morris | A61B 5/1118 700/91 |
| 2014/0270375 A1 | 9/2014 | Canavan | |
| 2015/0100141 A1* | 4/2015 | Hughes | G06Q 10/0639 700/92 |
| 2015/0238858 A1 | 8/2015 | Jeffery | |
| 2017/0004285 A1 | 1/2017 | Anderton | |
| 2017/0354845 A1* | 12/2017 | Williams | G16H 40/67 |
| 2018/0100762 A1 | 4/2018 | Park | |
| 2018/0133551 A1 | 5/2018 | Chang | |
| 2018/0303381 A1* | 10/2018 | Todd | A61B 5/7267 |
| 2020/0016457 A1 | 1/2020 | Ben-Chanoch | |
| 2020/0054931 A1* | 2/2020 | Martin | A61B 5/1118 |
| 2021/0008413 A1 | 1/2021 | Asikainen | |
| 2021/0394020 A1 | 12/2021 | Killen | |
| 2022/0134182 A1* | 5/2022 | Hughes | G06F 1/163 482/8 |
| 2022/0226695 A1* | 7/2022 | Madonna | A63B 24/0006 |
| 2022/0241644 A1* | 8/2022 | Kang | A63B 24/0062 |

FOREIGN PATENT DOCUMENTS

| | | |
|---|---|---|
| WO | WO 2020-243269 A1 | 12/2020 |
| WO | WO 2022-025877 A1 | 2/2022 |

OTHER PUBLICATIONS

Shun Ishii et al., ExerSense: Physical Exercise Recognition and Counting Algorithm from Wearables Robust to Positioning; Sensors 2021, 21(1), 91; https://doi.org/10.3390/s21010091, 2020.

Dan Morris, et al., RecoFit: Using a Wearable Sensor to Find, Recognize, and Count Repetitive Exercises; [submitted to CHI '14 Proceedings of the SIGCHI Conference on Human Factors in Computing Systems]; https://www.microsoft.com/en-us/research/publication/recofit-using-wearable-sensor-find-recognize-count-repetitive-exercises/, 2014.

Michal Sustr, Counting repetitions of exercises from body worn sensors; Czech Technical University in Prague Faculty of Electrical Engineering Department of Cybernetics, Diploma Thesis; michal.sustr.sk/DP.pdf, 2015.

Extended European Search Report in Application No. 23775224.1-1218 / 4453750 PCT/KR2023003477, Feb. 14, 2025.

* cited by examiner

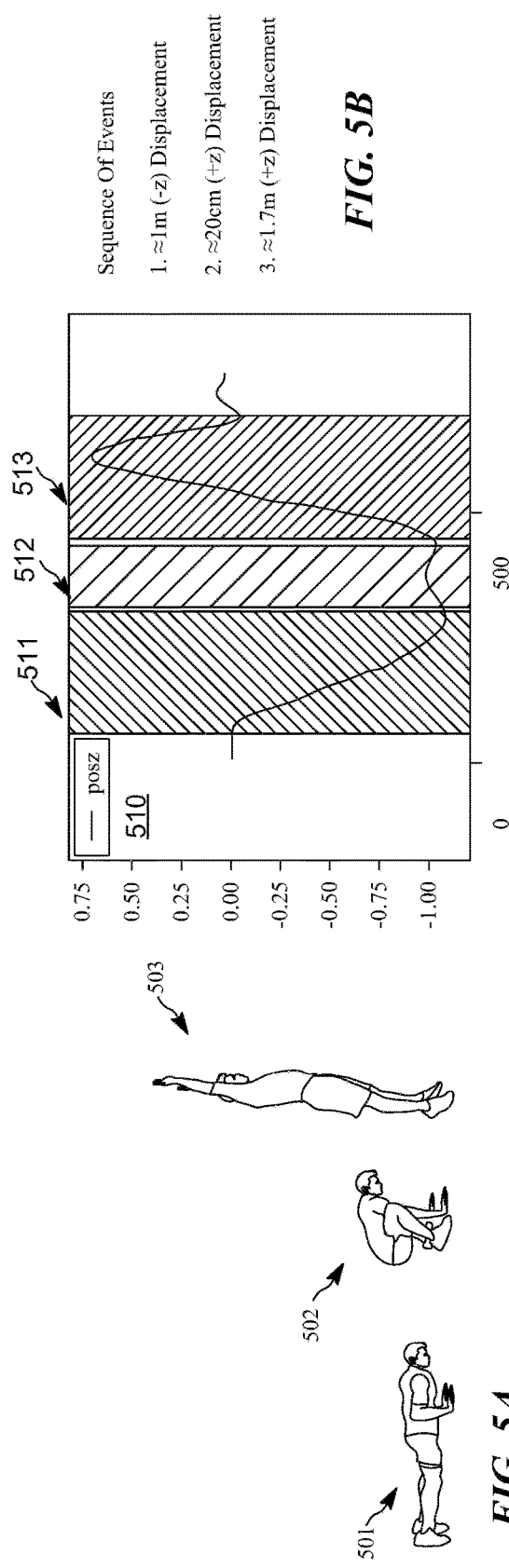
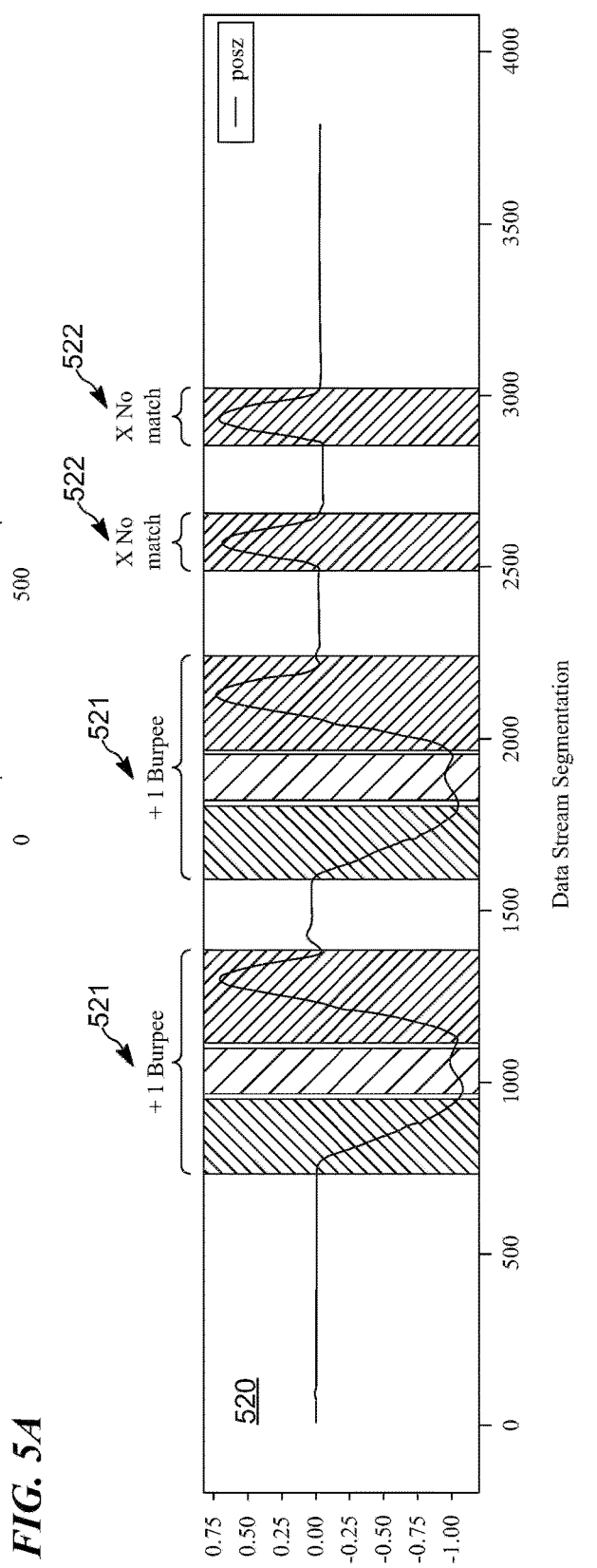
FIG. 5A
FIG. 5B
FIG. 5C

SYSTEMS AND METHOD FOR SEGMENTATION OF MOVEMENT REPETITIONS AND EXTRACTION OF PERFORMANCE METRICS

TECHNICAL FIELD

This disclosure relates generally to database and file management within network environments, and in particular relates to searching a database of predetermined movement signatures.

BACKGROUND

Physical activity is paramount for the overall well-being and quality of life of an individual. However, many individuals face barriers to exercise, such as a lack of time or interest, loss of motivation, or inconvenience. Specifically, gyms and fitness studios may lack offerings that facilitate convenient and consistent exercise. Moreover, the COVID-19 worldwide pandemic has also significantly impacted gyms and fitness studios. Many of these have had to close their doors and many individuals may not feel comfortable in visiting establishments that remain open. This situation has motivated the emergence of virtual fitness, which brings users the experience of working out from the comfort of their own home or wherever they are.

Moreover, current tools used for communication over the internet, such as programs for video conferencing or video content sharing were not designed to provide an experience resembling an in-person fitness class. Improving this experience requires augmenting physical activity with sensors and algorithms that can, in real-time, recognize and extract performance metrics for specific activities and movements.

BRIEF DESCRIPTION OF THE DRAWINGS

FIG. 5A illustrates a user performing a single burpee repetition at three points in time.

FIG. 5B illustrates a graph of displacement data for three segments of a single burpee repetition.

FIG. 5C illustrates the results of executing a movement signature search algorithm on an electronic device for a user performing burpees.

DESCRIPTION OF EXAMPLE EMBODIMENTS

Mobile Client System Overview

Figure 1:
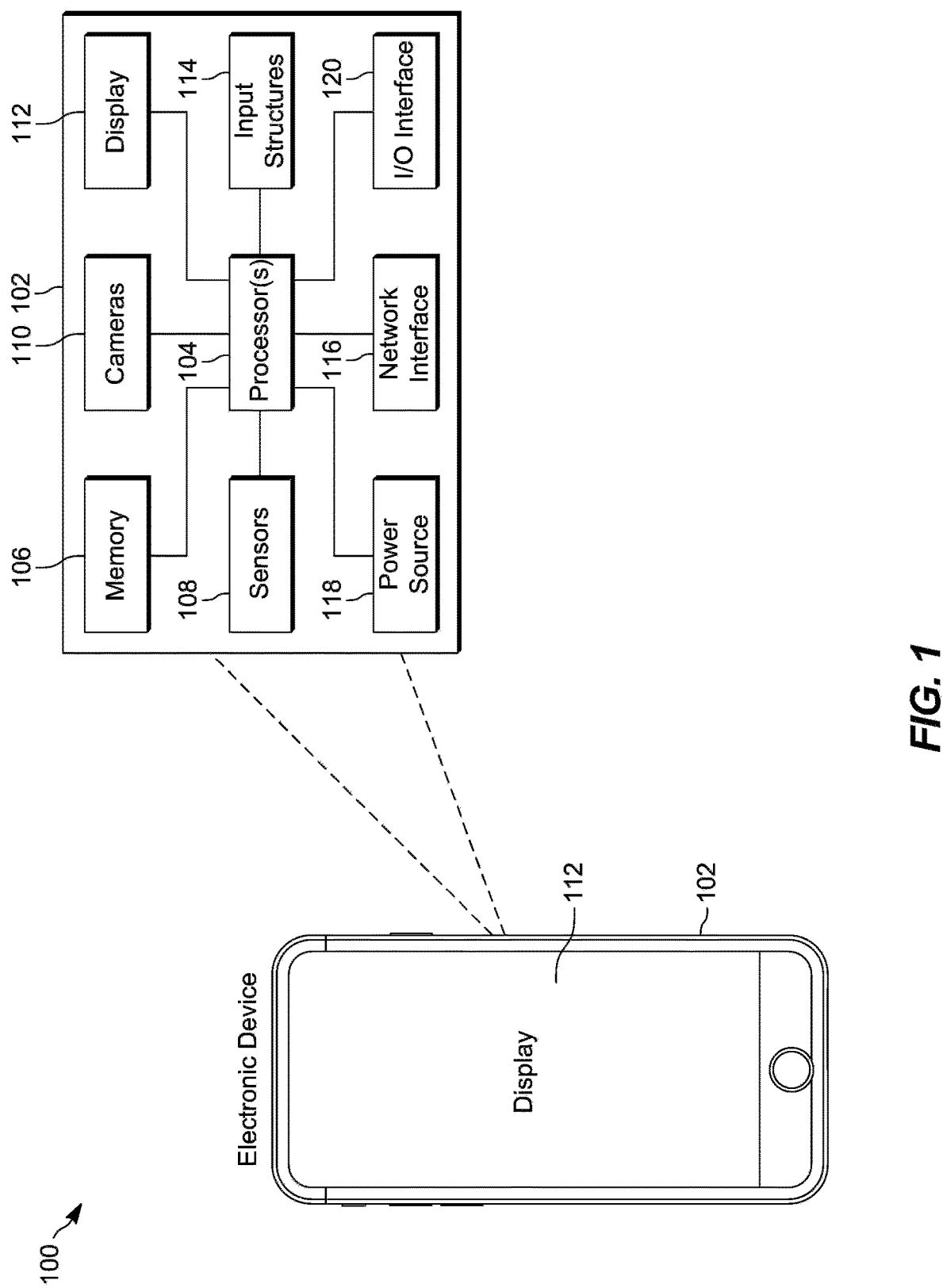
FIG. 1 illustrates an example electronic device, in accordance with presently disclosed embodiments.

FIG. 1 illustrates an example electronic device 100, in accordance with presently disclosed embodiments. In particular embodiments, the electronic device 100 may include, for example, any of various personal electronic devices 102, such as a mobile phone electronic device, a tablet computer electronic device, a laptop computer electronic device, and so forth. In particular embodiments, as further depicted by FIG. 1, the personal electronic device 102 may include, among other things, one or more processor(s) 104, memory 106, sensors 108, cameras 110, a display 112, input structures 114, network interfaces 116, a power source 118, and an input/output (I/O) interface 120. It should be noted that FIG. 1 is merely one example of a particular implementation and is intended to illustrate the types of components that may be included as part of the electronic device 100.

In particular embodiments, the one or more processor(s) 104 may be operably coupled with the memory 106 to perform various algorithms, processes, or functions. Such programs or instructions executed by the processor(s) 104 may be stored in any suitable article of manufacture that includes one or more tangible, computer-readable media at least collectively storing the instructions or routines, such as the memory 106. The memory 106 may include any suitable articles of manufacture for storing data and executable instructions, such as random-access memory (RAM), read-only memory (ROM), rewritable flash memory, hard drives, and so forth. Also, programs (e.g., an operating system) encoded on such a computer program product may also include instructions that may be executed by the processor(s) 104 to enable the electronic device to provide various functionalities.

In particular embodiments, the sensors 108 may include, for example, one or more cameras (e.g., depth cameras), touch sensors, microphones, motion detection sensors, thermal detection sensors, light detection sensors, time of flight (ToF) sensors, ultrasonic sensors, infrared sensors, or other similar sensors that may be utilized to detect various user inputs (e.g., user voice inputs, user gesture inputs, user touch inputs, user instrument inputs, user motion inputs, and so forth). The cameras 110 may include any number of cameras (e.g., wide cameras, narrow cameras, telephoto cameras, ultra-wide cameras, depth cameras, and so forth) that may be utilized to capture various 2D and 3D images. The display 112 may include any display architecture (e.g., AMLCD, AMOLED, micro-LED, and so forth), which may provide further means by which users may interact and engage with the electronic device 100. In particular embodiments, as further illustrated by FIG. 1, one more of the cameras 110 may be disposed behind, underneath, or alongside the display 112 (e.g., one or more of the cameras 110 may be partially or completely concealed by the display 112), and thus the display 112 may include a transparent pixel region and/or semi-transparent pixel region through which the one or more concealed cameras 110 may detect light, and, by extension, capture images. It should be appreciated that the one more of the cameras 110 may be disposed anywhere behind or underneath the display 110, such as at a center area behind the display 110, at an upper area behind the display 110, or at a lower area behind the display 110.

In particular embodiments, the input structures 114 may include any physical structures utilized to control one or more global functions of the electronic device 100 (e.g., pressing a button to power "ON" or power "OFF" the electronic device 100). The network interface may include, for example, any number of network interfaces suitable for allowing the electronic device 100 to access and receive data over one or more cloud-based networks (e.g., a cloud-based service that may service hundreds or thousands of the electronic device 100 and the associated users corresponding thereto) and/or distributed networks. The power source 118 may include any suitable source of power, such as a rechargeable lithium polymer (Li-poly) battery and/or an alternating current (AC) power converter that may be utilized to power and/or charge the electronic device 100 for operation. Similarly, the I/O interface 120 may be provided to allow the electronic device 100 to interface with various other electronic or computing devices, such as one or more auxiliary electronic devices.

Segmentation of Movement Repetitions and Extraction of Performance Metrics

Figure 2:
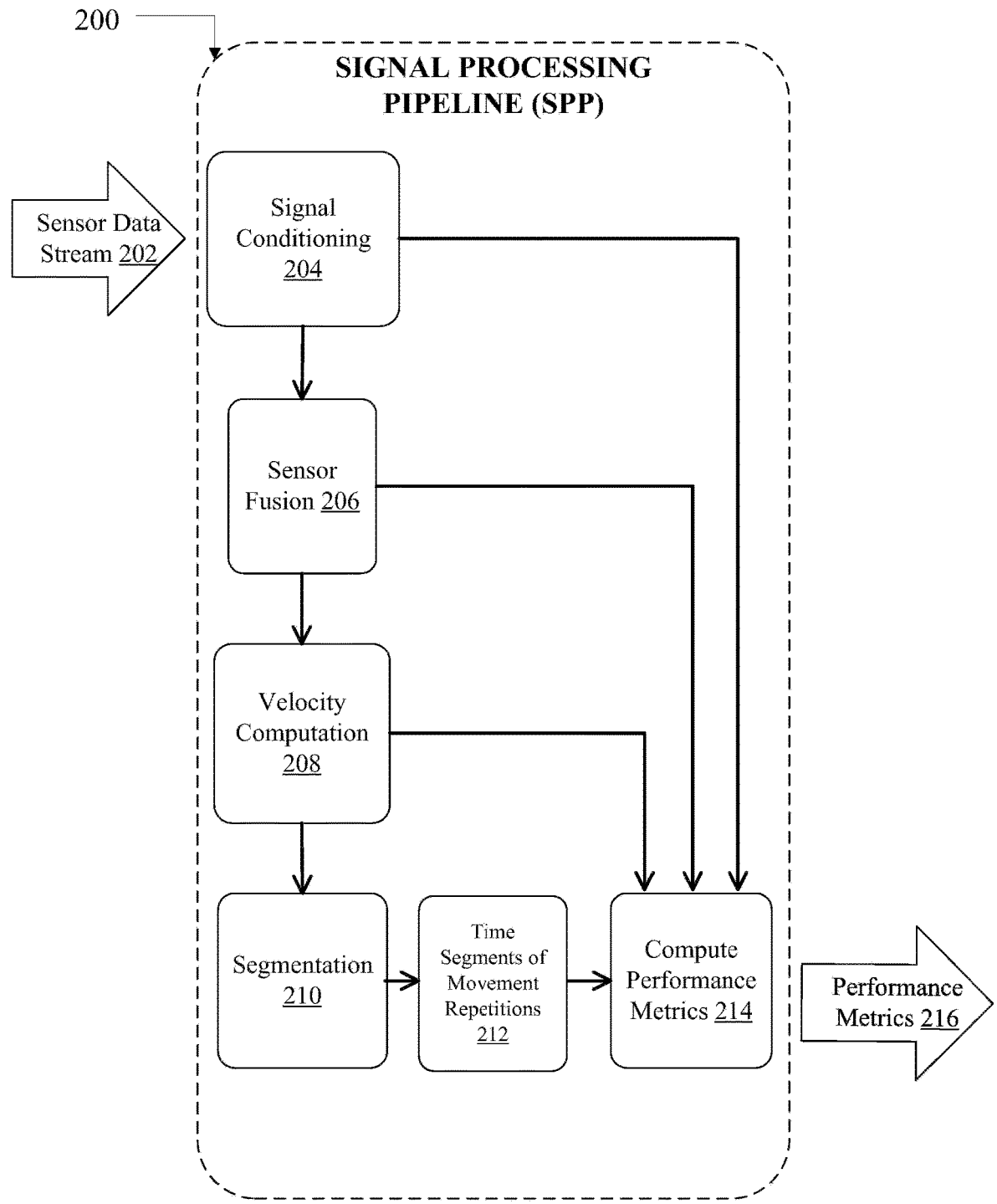
FIG. 2 illustrates an example signal processing pipeline and its context of use.

FIG. 2 illustrates an example signal processing pipeline 200 and its context of use. In particular embodiments, a sensor or sensor array that is worn by a user produces a sensor data stream 202. As an example and not by way of limitation, the sensor array may comprise one or more of an accelerometer, a gyroscope, a magnetometer, a heartrate monitor, a global positioning system (GPS), a barometer, or a power meter. As an example, and not by way of limitation, one or more of the sensors of the sensor array may be encased inside one or more wearable devices of the user. In particular embodiments, the signal processing pipeline 200 receives the sensor data stream 202 as input and outputs performance metrics 216 for one or more time segments of movement repetitions 212. In particular embodiments, the streaming sensor data 202 enters pipeline 200 and is transformed through signal conditioning 204, sensor fusion 206, velocity computation 208, and segmentation 210. In particular embodiments, the time segments of movement repetitions 212 identified in the segmented 210 data may be processed with intermediate data such as raw sensor data, sensor fusion data, velocity data, or segmentation data to compute performance metrics 214. Finally, in particular embodiments, the performance metrics may be displayed to the user, transmitted over a network, or written to a file.

As used herein, "performance metrics" may refer to measurable qualities or skills of an individual that participates in an activity that can be improved. Performance metrics may be gauges that can be analyzed and studied to perfect movements of a specific activity. As an example, and not by way of limitation, performance metrics may include speed, time, jump height, weight lifted, length, height, acceleration, posture, distances covered, heart rate responses.

As used herein, "real-time" may refer to a level of computer responsiveness that a user senses as sufficiently immediate or that enables the computer to keep up with some external process.

As used herein, "wearable device" may refer to an electronic device worn by an individual comprising one or more of a housing that encases components of the wearable device, an internal clock, a battery, one or more sensors, a memory, an internal storage, one or more communications interfaces, one or more output forms, or a processor. As an example, and not by way of limitation, the one or more sensors of the wearable device may comprise an accelerometer, a gyroscope, a magnetometer, a heartrate monitor, a global positioning system (GPS), a barometer, or a power meter. In particular embodiments, a wearable device may be capable of processing data from any or all available sensors, and/or streaming the sensors' raw data through its communication interfaces to another processing device; as an example, and not by way of limitation, the wearable device may stream such data to a computer or a mobile phone. As an example, and not by way of limitation, a wearable device may comprise a smart watch, a mobile phone, smart earbuds, smart shoes, or smart gloves. Although this disclosure describes calculating and displaying performance metrics using particular wearable devices, this disclosure contemplates using the disclosed novel signal processing pipeline in the context of any suitable wearable device.

As used herein, "activity" may refer to a physical activity requiring skill or prowess. As an example, and not by way of limitation, dancing, yoga, calisthenics, weightlifting, boxing, walking, running, cycling, and swimming can be considered activities as used herein. Although this disclosure describes a user performing particular activities, this disclosure contemplates a user performing any suitable activity.

As used herein, "movement" may refer to a specific motion that takes place in the context of an activity. As an example, and not by way of limitation, a body roll may be a movement in the activity of dancing, a bench press may be a movement in the activity of weightlifting, a push-up may be a movement in the activity of calisthenics, a step may be a movement in the activity of walking or running, a stroke may be a movement in the activity of swimming, and a pedal may be a movement in the activity of cycling. In some activities, such as weightlifting or calisthenics, a movement may also be called an "exercise." Although this disclosure describes detecting particular movements of a user, this disclosure contemplates detecting any suitable movements of a user.

As used herein, "repetition" may refer to one complete cycle of a movement when performing an activity. Repetitions may be a means to track a number of movements performed in a given amount of time for a particular activity. As an example, and not by way of limitation, a user may perform three repetitions of a bench press (a movement) in weightlifting (an activity).

As used herein, "movement signature" may refer to a unique sensor signal created when a repetition of a given movement in a specific activity is performed. A movement signature may be thought of as a fingerprint, and a movement signature may be used to segment one or more movement repetitions out of a sensor data stream, as explained here with more specificity.

As used herein, "Virtual Fitness" may refer to the fusion of exercise with technology designed to allow a user to engage in exercise easily, conveniently, and on the user's own schedule.

Certain technical challenges exist for improving the Virtual Fitness experience for a user by augmenting physical activity with sensors and algorithms that can, in real-time, recognize and extract performance metrics for specific activities and movements. One technical challenge may include that some sensors that could be used to track a user's movements remotely, such as cameras, depth sensors, and radars cannot be worn by the user and require complex setup and high computational power. These sensors may also have high power consumption. The solution presented by the embodiments disclosed herein to address this challenge may be to leverage one or more sensors included in one or more wearable devices of the user. Moreover, developing algorithms that can recognize specific actions and extract performance metrics in real-time from a single wearable device is also a challenging problem, as there are no obvious or direct ways to relate the recorded sensor data to specific human activities and each subject may perform an activity with significant variation. Certain state-of-the-art approaches require collecting data to train a model which is a burden for users and a disadvantage towards deploying the technology. Other approaches are based on simple thresholding to segment a data stream, and this technique may result in very poor performance. The solution presented by the embodiments disclosed herein to address this challenge may be to identify, based on displacement data calculated using streaming sensor data, one or more repetitions represented in one or more corresponding segments of the displacement data, wherein the displacement data corresponding to each identified repetition substantially matches a predetermined movement signature associated with the type of movement.

Although particular embodiments of the disclosed technology are directed to solving certain technical challenges in the domain of Virtual Fitness, the disclosed technology is not limited to the domain of Virtual Fitness. As an example, and not by way of limitation, the disclosed technology may also solve technical challenges in the domains of in-person fitness, activity trackers, artificial intelligence personal coaching, electronic gaming, gesture recognition based input systems, and robotics.

Certain embodiments disclosed herein may provide one or more technical advantages. A technical advantage of the embodiments may include executing a repetition segmentation algorithm that does not require collecting a large amount of data and using that data to train a machine learning mode. Another technical advantage of the embodiments may include functioning with real-time data and being capable of providing feedback to the user virtually immediately after a movement is performed. Certain embodiments disclosed herein may provide none, some, or all of the above technical advantages. One or more other technical advantages may be readily apparent to one skilled in the art in view of the figures, descriptions, and claims of the present disclosure.

In particular embodiments, the electronic device 100 may receive a digital input indicating a type of movement. In particular embodiments, the electronic device 100 may receive a digital input formatted in a particular manner from a prescribed source, wherein the input indicates that a first user of the electronic device is about to engage in the indicated type of movement. As an example, and not by way of limitation, the electronic device 100 may receive a digital input from a mobile device that indicates that a first user of the electronic device 100 intends to perform one or more push-ups. As another example and not by way of limitation, the electronic device 100 may receive a digital input from a server computer that indicates that a first user of the electronic device 100 intends to perform one or more burpees. In particular embodiments, the electronic device 100 may be a wearable device of the first user. As an example, and not by way of limitation, the electronic device 100 may be a smart watch of the first user. Although this disclosure describes receiving a digital input indicating a type of movement in a particular manner, this disclosure contemplates receiving a digital input indicating a type of movement in any suitable manner.

In particular embodiments, the electronic device 100 may access, from one or more sensors of one or more wearable devices on a first user, streaming sensor data corresponding to movements of the first user. In particular embodiments, the electronic device 100 may access data of one or more sensors of one or more wearable devices on a first user, wherein the streaming sensor data records information about the movements of the first user while the first user is performing movements pursuant to an activity. In particular embodiments, the streaming sensor data represents the movements of the first user performing the activity indicated by the received digital input. As an example, and not by way of limitation, the electronic device 100, such as a smart watch, may access raw, unfiltered, uncalibrated data from a Magnetometer and a Gyroscope contained in the smart watch. As another example, and not by way of limitation, the electronic device 100, such as smart earbuds, may access data from an accelerometer contained in a smart phone of the first user which is paired with the smart earbuds. Although this disclosure describes particular electronic devices 100 accessing particular data streams in a particular manner, this disclosure contemplates any suitable electronic devices 100 accessing any suitable data streams in any suitable manner.

In particular embodiments, the electronic device 100 may be programmed to perform signal conditioning 204 (FIG. 2) by calibrating the streaming sensor data by correcting for one or more of bias, noise, or scale factors. In particular embodiments, the electronic device may be programmed to perform signal conditioning 204 by filtering the streaming sensor data by applying one or more of a high-pass filter, a low-pass filter, or a band-pass filter. Although this disclosure describes performing signal conditioning 204 by executing particular methods of sensor calibration or filtering, this disclosure contemplates performing signal conditioning 204 in any suitable manner.

In particular embodiments, the electronic device 100 may be programmed to generate fused sensor data 206 by combining components of the streaming sensor data, wherein the streaming sensor data comprises data from two or more of an accelerometer, a magnetometer, or a gyroscope, and wherein the fused sensor data comprises linear acceleration data. In particular embodiments, data from an accelerometer, a magnetometer and a gyroscope may be combined to generate a better (more consistent, accurate and dependable) understanding of the electronic device's 100 orientation and heading. As an example, and not by way of limitation, signal conditioning can be implemented by executing techniques such as a Kalman, Complementary, Madgwick, or Mahony filtering with a combination of two or more sensors. In particular embodiments, using all three of an accelerometer, a magnetometer and a gyroscope may be particularly effective. As an example, and not by way of limitation, outputs of sensor fusion may include: accelerometer data, magnetometer data, gyroscope data, gravity vector data (reporting the direction and magnitude of gravity in the sensor frame of reference [SFoR]), orientation data (reporting the attitude of the electronic device 100 [e.g., azimuth, pitch, or roll], rotation data (reporting the orientation of the device relative to the east-north-up coordinates frame [earth frame of reference or EFoR]), linear acceleration SFoR data (reporting the linear acceleration of the device in the sensor frame of reference, not including gravity), linear acceleration EFoR data (transforming the linear acceleration SFoR data into the earth frame of reference using the rotation quaternion), and linear acceleration magnitude data (indicating the size of the linear acceleration vector). In particular embodiments, the linear acceleration EFoR data may be particularly useful because, for example, a linear acceleration in the "up" direction (perpendicular to the floor) will always show up in the Z axis independently of the orientation on which the sensor is mounted on the first users' body. Although this disclosure describes performing sensor fusion 206 to combine data from particular types of sensors to generate particular types of combined data in particular ways, this disclosure contemplates combining data from any suitable types of sensors to generate any suitable types of combined data in any suitable manner.

In particular embodiments, velocity data may be generated 208 by integrating linear acceleration data. As an example, and not by way of limitation, velocity data may be computed by integrating the linear acceleration EFoR resulting from signal conditioning and senor fusion. In particular embodiments, the electronic device 100 may programmed to perform zero-velocity compensation. In particular instance, sensors may have bias or other high frequency noises that may corrupt velocity estimation. Over time, the velocity estimation may smoothly drift away from a true velocity due to random walk and integrating any bias in the measurements. In particular embodiments, in order to mitigate such drift error, first the velocity may be "zeroed-out" during stationary periods (when a sensor is determined to be not moving). A stationary period may be detected when a moving average of the linear acceleration magnitude is less than or equal to a predetermined threshold. Second, integral drift may be removed during non-stationary periods. In particular embodiments, this may be accomplished by: finding a velocity difference between the start and end of a non-stationary period; determining a drift rate by dividing the velocity difference by the number of samples of the non-stationary period; multiplying the drift rate with a corresponding data index to obtain a drift value; and subtracting the drift value from the previously calculated velocity to get a corrected linear velocity. Although this disclosure describes performing velocity computation 208 in a particular manner, this disclosure contemplates performing velocity computation 208 in any suitable manner.

In particular embodiments, the electronic device 100 may generate, based on the streaming sensor data and the indicated type of movement, displacement data corresponding to the movements of the first user. In particular embodiments, the displacement data may be generated using the velocity data. In particular embodiments, the electronic device may generate data indicating changes in position of the first user while the first user is performing one or more repetitions of one or more movements of an activity. As an example, and not by way of limitation, the electronic device 100 may receive a digital input indicating that the first user is about to perform one or more push-ups and subsequently generate displacement from the streaming sensor data representing changes in position of the first user while the first user is performing push-ups. As another example, and not by way of limitation, the electronic device 100 may generate displacement data that shows changes in position of the first user while the first user is performing one or more burpees.

In particular embodiments, a displacement (a change in position) of the electronic device 100 can show up as a peak or valley in the velocity data. The left and right bases of the peak/valley may correspond to the start and end timestamps of the displacement. The position displacement detection can be performed on the velocity vector expressed in different coordinate systems depending on the nature of the movement. As an example, and not by way of limitation, the velocity vector can be expressed in coordinate systems such as cartesian, cylindrical, or polar. As a first example, a movement with linear components may be easier to detect in a cartesian coordinate system. As a second example, a movement with circular motions may be easier to detect in a cylindrical coordinate system, but harder to detect in a cartesian coordinate system. In particular embodiments, a coordinate system may be selected from a predetermined set of coordinate systems based on the type of movement indicated by the digital input, and the displacement data can be generated using the selected coordinate system. Although this disclosure describes detecting position displacements using particular coordinate systems, this disclosure contemplates detecting position displacements in any suitable manner using any suitable coordinate systems.

Figure 3:
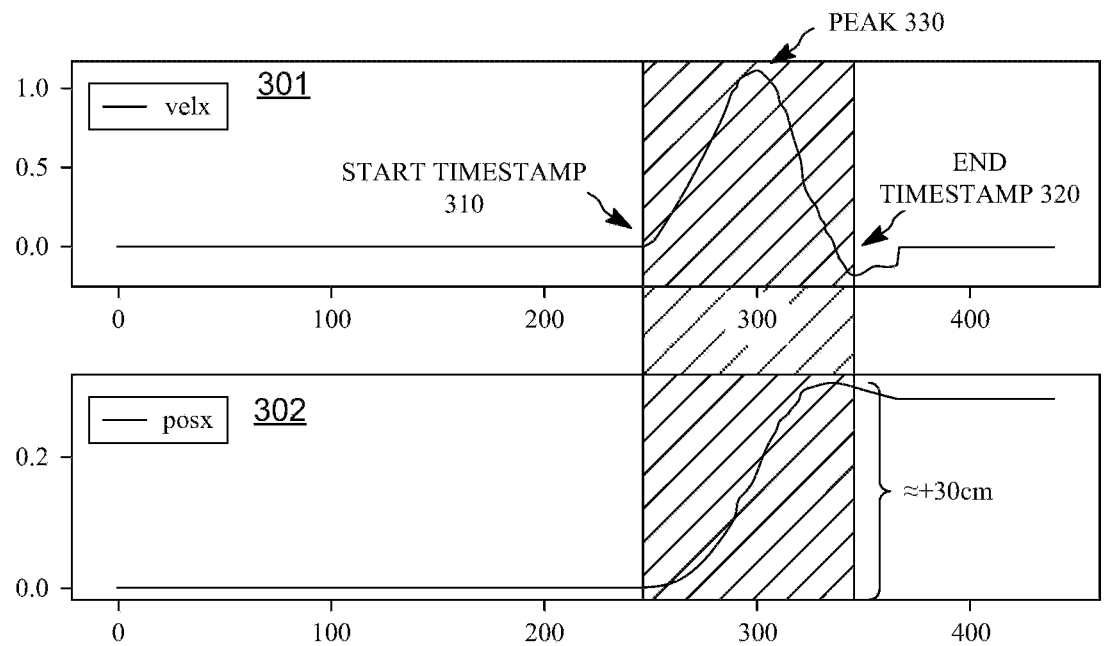
FIG. 3 illustrates a first example of a process for detecting and calculating position displacements from velocity data.

FIG. 3 illustrates a first example of a process for detecting and calculating position displacements from velocity data. FIG. 3 depicts a pair of graphs 301, 302. Graph 301 shows first example velocity data corresponding to the first example position displacements of graph 302. Graphs 301, 302 show an example of substantially forward displacement: almost all of the velocity values are positive in the depicted time period between the start timestamp 310 and the end timestamp 320. Graph 301 shows a single peak 330 in the velocity data where the slope of the velocity curve is approximately zero. The slope of the velocity curve is also approximately zero at the start timestamp 310 and the end timestamp 320. Thus, the period of time between the start timestamp 310 and the end timestamp 320 is a period of forward displacement. This fact is reflected in the corresponding graph 302 which shows the corresponding position displacements calculated for the same time period as graph 301. The position displacements of graph 302 can be generated, for example, by integrating the velocity data represented in graph 301 between the start timestamp 310 and the end timestamp 320, as explained further herein with greater specificity. Although this disclosure describes processing particular patterns of displacements detected in the velocity data in particular ways, this disclosure contemplates processing any suitable patterns of displacement in any suitable manner.

Figure 4:
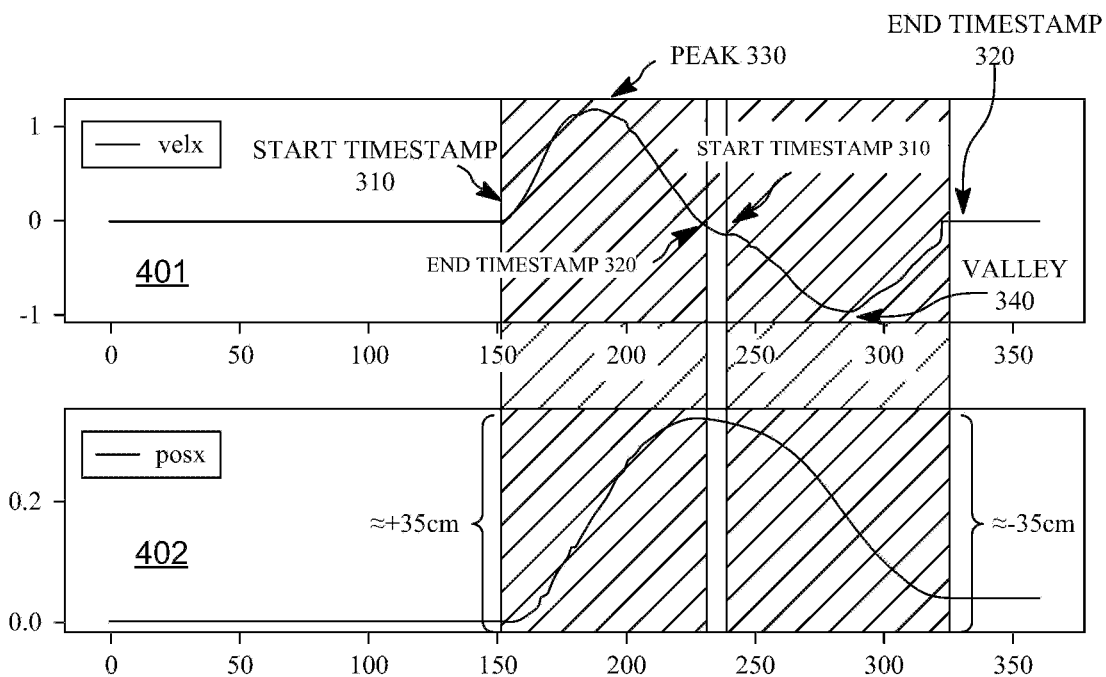
FIG. 4 illustrates a second example of a process for detecting and calculating position displacements from velocity data.

FIG. 4 illustrates a second example of a process for detecting and calculating position displacements from velocity data. FIG. 4 depicts a pair of graphs 401, 402. Graph 401 shows second example velocity data corresponding to the second example position displacements of graph 402. Similar to graph 301, graph 401 depicts a start timestamp 310 and an end timestamp bounding a peak 330 in the velocity data, representing a period of forward displacement. On the other hand, graph 401 differs from graph 301 because it also depicts a valley 340 which is also a point of zero velocity in the velocity curve bounded by a second start timestamp 310 and a second end timestamp 320. As recited herein, the difference between a peak 330 and a valley 340 is that the valley 340 is a point of zero velocity surrounded by velocity values which are substantially negative. Thus, the time period between the second start timestamp 310 and the second end timestamp 320 in graphs 401, 402 represents a period of backward displacement. Although this disclosure describes processing particular patterns of displacements detected in the velocity data in particular ways, this disclosure contemplates processing any suitable patterns of displacement in any suitable manner.

In particular embodiments, the electronic device is programmed to generate the displacement data corresponding to the movements of the first user by: identifying one or more position displacements indicated by the velocity data; calculating a corresponding displacement value, a corresponding start time, and a corresponding end time for each of the one or more position displacements; and determining one or more displacement events based on the corresponding displacement values, the corresponding start times, and the corresponding end times for the one or more positions displacements, wherein the displacement data comprises information corresponding to the one or more displacement events, and wherein the predetermined movement signature is characterized by a sequence of particular displacement events that correspond to a single repetition of the type of movement. In particular embodiments, each displacement event may contain the start timestamp 310 and end timestamp 320 of a single displacement and the change in position during that single displacement. The process of generating displacement data comprising displacement events can be thought of as encoding the accessed signal with symbols, wherein each of the symbols is an event that represents a specific position displacement. Graphs 301, 302 show that a single displacement event may be detected. As an example, and not by way of limitation, this single displacement event of graphs 301, 302 might be encoded as "Event 1: {StartT: 237, EndT: 328, Displacement: 0.3}." Graphs 401, 402, show that two displacement events may be detected. As an example, and not by way of limitation, these two displacement events of graphs 401, 402 might be encoded as "Event 1: {StartT: 152, EndT: 234, Displacement: 0.35}" and "Event 2: {StartT: 239, EndT: 327, Displacement: −0.35}." In particular embodiments, generating displacements events as such may be part of the process of segmentation 210. Although this disclosure describes performing segmentation 210 in a particular manner, this disclosure contemplates performing segmentation 210 in any suitable manner.

In particular embodiments, the electronic device 100 may identify, based on the displacement data, one or more repetitions represented in one or more corresponding segments of the displacement data, wherein the displacement data corresponding to each identified repetition substantially matches a predetermined movement signature associated with the type of movement. As an example, and not by way of limitation, the electronic device 100 may identify that the first user has performed seven repetitions of push-ups. As another example, and not by way of limitation, the electronic device 100 may identify that the first user has performed five repetitions of burpees. Although this disclosure describes identifying repetitions of particular movements or exercises in a particular manner, as explained further herein, this disclosure contemplates identifying repetitions of suitable movements or exercises in any suitable manner.

In particular embodiments, each movement can be represented by a signature that is akin to a fingerprint. Each movement signature can be represented by a sequence of displacement events that together describe an overall motion. In particular embodiments, the fact that the movement signature is encoded in terms of position displacements may allow anyone familiar with the movement to create and digital store a predetermined movement signature for the movement, without needing to collect large amounts of data and/or train a machine learning model, presenting a distinct technical advantage over many state-of-the-art systems. For example, and not by way of limitation, a bench press repetition can be encoded with the following events: {Move up 50 cm, Move down 50 cm}.

In particular embodiments, the electronic device 100 can execute a movement signature search algorithm to analyze events in real-time and find sequences of events that match the movement signature of the indicated movement. Once the algorithm finds a match, it can output a movement start timestamp and a movement end timestamp by taking the start timestamp 310 of the first detected event and the end timestamp 320 of the last detected event. The algorithm can also be programmed to output the start timestamp 310 and the end timestamp 320 of each of the individual events that make up the movement. In other words, the algorithm can be programmed to output the time segments of movement repetitions 212. Notably, the movement signature of a specific movement seen from a sensor placed in different body locations may differ. Therefore, in particular embodiments, a movement signature for various possible body locations of a sensor can be stored so the system of particular embodiments can properly find a match. Moreover, for some movements, the displacement amount specified in the events of the movement signature may differ for different users. For example, the movement signature of a bench press encoded with {"Move up 50 cm, Move down 50 cm"} may work for a certain user, but for a user with shorter arms the displacement amount might need to be scaled down to {"Move up 40 cm, Move down 40 cm"}. As an example, and not by way of limitation, this scaling factor might be a function of the gender, height, or weight of the user. Although this disclosure describes using movement signatures and scaling factors in a particular manner, this disclosure contemplates using movement signatures and scaling factors in any suitable manner.

FIG. 5A illustrates a user performing a single burpee repetition at three points in time. At a first point in time 501, the user is at the bottom of a pushup. At the second point in time 502, the user is crouched and preparing to jump. At the third point in time 503, the user is descending from a jump and just about to touch the ground.

FIG. 5B illustrates a graph 510 of displacement data for three segments of a single burpee repetition. For example, FIG. 5B could correspond to the depiction of FIG. 5A. As depicted in FIG. 5B, as an example, and not by way of limitation, the predetermined movement signature for a burpee may be composed of a sequence of three displacement events or segments, 511, 512, 513: (1) a movement down to a push-up position 511 (e.g., ≈1 meter (−z) displacement), (2) a push-up 512 (≈20 centimeters (+z) displacement), and (3) a jump to full hip and knee extension 513 (≈1.7 meters (+z) displacement). The end of segment 511 corresponds to the point in time 501. The end of segment 512 corresponds to the point in time 502. The end of segment 513 corresponds to the point in time 503. Although this disclosure describes performing segmentation for a burpee in a particular manner, this disclosure contemplates performing segmentation for any suitable exercise in any suitable manner.

FIG. 5C illustrates the results of executing a movement signature search algorithm on an electronic device 100 for a user performing burpees. In particular, FIG. 5C illustrates, in a graph of displacement data 520, the detection of two repetitions of burpees 521. For example, FIG. 5C may depict the detection of two sequences of the displacement events depicted in FIG. 5B, followed by two displacement events that do not substantially match the predetermined movement signature for the burpee 521. In particular embodiments, whether a detected sequence of displacement events is sufficiently "matching" a movement signature can be determined in a variety of ways. As an example, and not by way of limitation, a measure of distance between a detected curve and a stored curve can be computed over the relevant interval and compared to a predetermined threshold value. As an example, and not by way of limitation, the Fréchet distance between the curves can be used as one such measure. As another example, and not by way of limitation, a percent deviation in the time and displacement value of each displacement event in the predetermined movement signature can be compared to the generated displacement events of the sensed movement of the first user. As an example, and not by way of limitation, the percent deviation may need to fault below a predetermined threshold to result in a "match." Although this disclosure describes determining whether displacement data corresponding to each identified repetition substantially matches a predetermined movement signature associated with the type of movement in a particular manner, a match may be determined in a suitable manner.

In particular embodiments, the electronic device 100 may calculate 214 one or more performance metrics 216 for one or more of the identified repetitions. In particular embodiments, performance metrics 216 can be calculated 214 for each of several time segments corresponding to movement repetitions 212. In particular embodiments, these calculations may take as input the start timestamp 310 and end timestamp 320 of each repetition and all of the available sensor data (e.g., the sensor data stream 202 and data generated by signal conditioning 204, sensor fusion 206, velocity computation 208, and segmentation 210). In particular embodiments, because all of the sensor data is synchronized, the start timestamps 310 and end timestamps 320 can be used to locate the relevant movement repetition inside the data stream of any of these types of sensor data, allowing for a coordinated computation of the performance metrics 216. In particular embodiments, performance metrics 216 are specific to each activity and movement and are dependent on the sensors available in the wearable device. As an example, and not by way of limitation, the electronic device 100 may be programmed to calculate the following performance metrics 216 for burpees: repetition count (the number of total repetitions incremented by one every time a repetition is detected), repetition duration (the number of seconds that the user takes to perform the repetition calculated as end timestamp 310–start timestamp 320), repetition rate (how many repetitions per second the user performs calculated as the rolling average of 1/(repetition duration), push-up duration (how long the user takes to do the push-up), push-up depth (how close the user gets to the floor when performing the push up), jump airtime duration (the length of the period of freefall after jumping), jump height (how high the user jumped in the last phase of the burpee), and jump explosivity (the acceleration in the execution of the jump). As an example, and not by way of limitation, the jump explosivity can be calculated by locating the push-off section of the jump (the event inside the jump section with a positive displacement), of each repetition in the accelerometer data stream, and extracting the acceleration. In particular embodiments, one or more of the one or more performance metrics 216 can be calculated less than 100 milliseconds after a completion of a first repetition of the one or more identified repetitions. Although this disclosure describes calculating particular performance metrics 216 in a particular manner, this disclosure contemplates calculating any suitable performance metrics 216 in any suitable manner using the available or accessible sensor data.

In particular embodiments, the electronic device 100 may provide instructions for presenting a user interface comprising information referencing one or more of the performance metrics 216. In particular embodiments, the electronic device may transmit control instructions to a device to display the one or more of the performance metrics 216 in a graphical user interface (GUI). As an example, and not by way of limitation, the electronic device 100 may display performance metrics 216 for a single repetition in the form of a table, graph, chart, or other textual or graphical visualization. As another example, and not by way of limitation, the electronic device may summarize, rank, or grade performance metrics 216 for a set of repetitions for display in a GUI. As an example, and not by way of limitation, the control instructions may be in the form of executable code in a programming language or an application programming interface (API) command. In particular embodiments, the electronic device 100 may cause the performance metrics 216 to be displayed on the electronic device 100 itself, while in other embodiments the performance metrics may be displayed on a companion device or other device over a network. Although this disclosure describes presenting performance metrics 216 in a particular manner, this disclosure contemplates presenting performance metrics 216 in any suitable manner.

In the domain of fitness, the disclosed signal processing pipeline 200 can be used in the context of Virtual Fitness, in-person fitness, activity trackers, or an artificial intelligence personal coach. Virtual Fitness allows people to exercise conveniently and consistently whenever and wherever they are. Improving the Virtual Fitness experience may require sensors and algorithms that can provide active feedback of performance to users and their coaches located in a remote location. Particular embodiments of the disclosed technology may provide such features. Examples of virtual fitness include live or prerecorded classes or guided workouts for activities such as yoga, dancing, boxing, calisthenics, weightlifting, walking, running, cycling, or others. Particular embodiments of the disclosed technology can also be used in physical locations—like gyms or fitness studios— to provide active feedback to users and coaches during a class or when users are working out alone. Information about the user's performance could be shown, for example, on a big screen inside the class, on a tablet-sized screen, or on the user's watch, depending on the type of activity. The disclosed technology can also be used within the context of activity trackers (smart watch, smart earbuds, smart bands, . . . ). Since activity trackers may already be equipped with an inertial measurement unit (IMU) and other sensors to monitor a user's physical activity, a simple software update could enable the novel features presented in this invention to be utilized. Finally, particular embodiments of the disclosed technology, can enable Artificial Intelligence (AI) coaches. The calculated performance metrics 216 could be used by an AI agent to actively respond to unique user strengths and weaknesses. Moreover, training could be adapted and personalized directly to fit the user's needs and abilities.

In the domain of gaming, particular embodiments of the disclosed technology can be used to recognize specific movements of a player. The player could wear a sensor device, that together with the player's body, would act as a controller, for example to drive an object or avatar inside a game. The uses could enable a new category of competition that may be referred to as "Sweaty E-Sports", where competitors use their bodies as a human-computer interface and have to move to achieve the goals of the game.

Additionally, particular embodiments of the disclosed technology can be used to recognize gestures and act as an input interface for other systems. As an example, where the electronic device 100 is a smart watch, a user could perform specific gestures to trigger specific actions (e.g., moving an arm up to take a call, or moving an arm down to reject a call).

Additionally, particular embodiments of the disclosed technology can be used in the field of robotics. As an example, and not by way of limitation, a user could be an autonomous robot and the signal processing pipeline 200 could be used in the feedback loop of its controlling algorithm to verify that a movement has been actually performed. As another example and not by way of limitation, the signal processing pipeline 200 could be used with a manually controlled robot to inform the user that the movement that the robot was instructed to do was performed.

Figure 6:
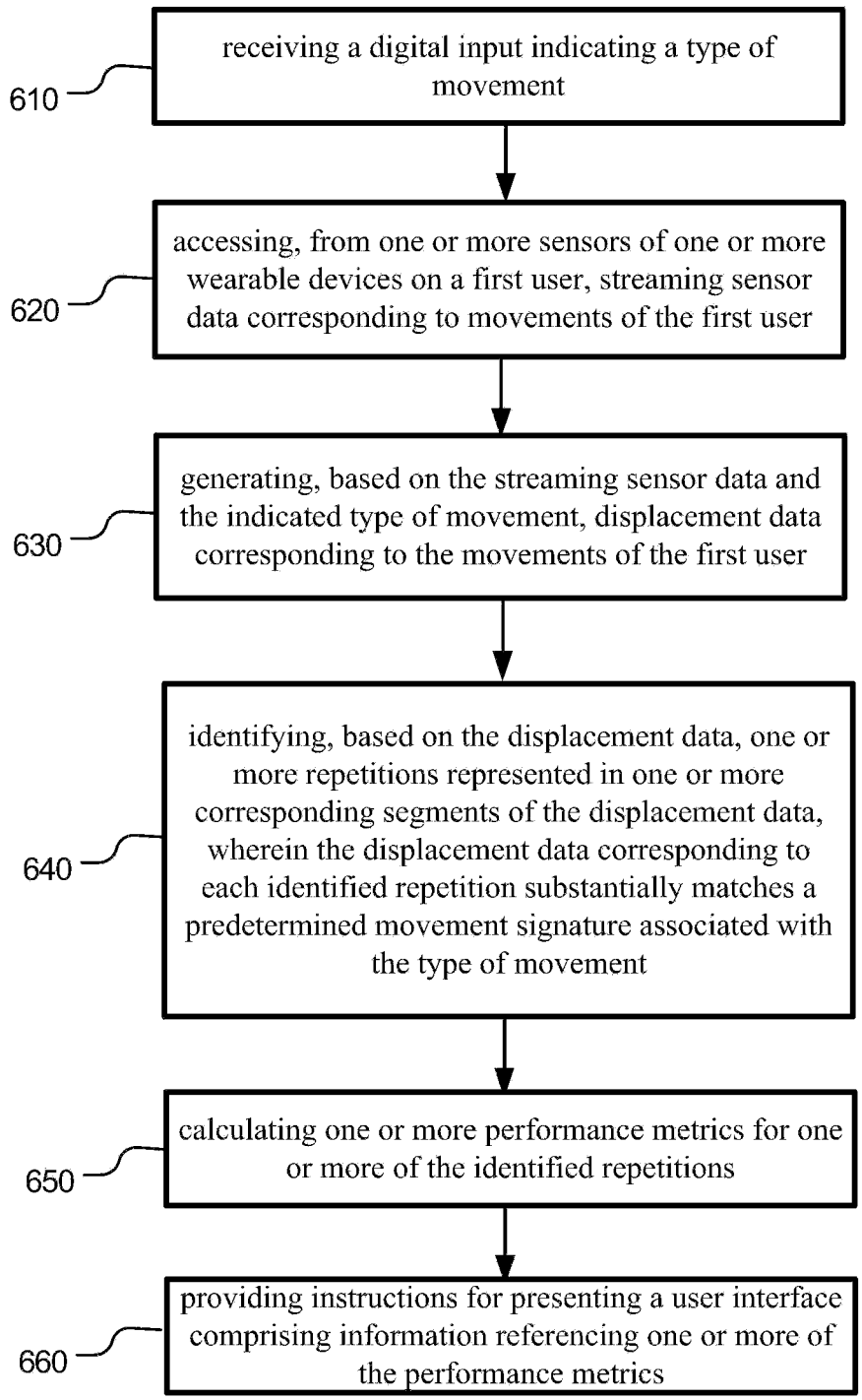
FIG. 6 illustrates an example method for segmentation of movement repetitions and extraction of performance metrics in real-time with low-latency feedback.

FIG. 6 illustrates is a flow diagram of a method 600 for segmentation of movement repetitions and extraction of performance metrics in real-time with low-latency feedback, in accordance with the presently disclosed embodiments. The method 600 may be performed utilizing one or more processing devices (e.g., electronic device 100) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing 2D and 3D image data, software (e.g., instructions running/executing on one or more processors), firmware (e.g., microcode), or some combination thereof.

The method 600 may begin at step 610 with the one or more processing devices (e.g., electronic device 100) receiving a digital input indicating a type of movement. The method may then continue at step 620 with the one or more processing devices (e.g., electronic device 100) accessing, from one or more sensors of one or more wearable devices on a first user, streaming sensor data corresponding to movements of the first user. The method 600 may then continue at step 630 with the one or more processing devices (e.g., electronic device 100) generating, based on the streaming sensor data and the indicated type of movement, displacement data corresponding to the movements of the first user. The method 600 may then continue at block with the one or more processing devices (e.g., electronic device 100) identifying, based on the displacement data, one or more repetitions represented in one or more corresponding segments of the displacement data, wherein the displacement data corresponding to each identified repetition substantially matches a predetermined movement signature associated with the type of movement. The method 600 may then continue at step 650 with the one or more processing devices (e.g., electronic device 100) calculating one or more performance metrics for one or more of the identified repetitions. The method 600 may then continue at step 660 with the one or more processing devices (e.g., electronic device 100) providing instructions for presenting a user interface comprising information referencing one or more of the performance metrics. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for segmentation of movement repetitions and extraction of performance metrics in real-time with low-latency feedback including the particular steps of the method of FIG. 6, this disclosure contemplates any suitable method for segmentation of movement repetitions and extraction of performance metrics in real-time with low-latency feedback including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Systems and Methods

Figure 7:
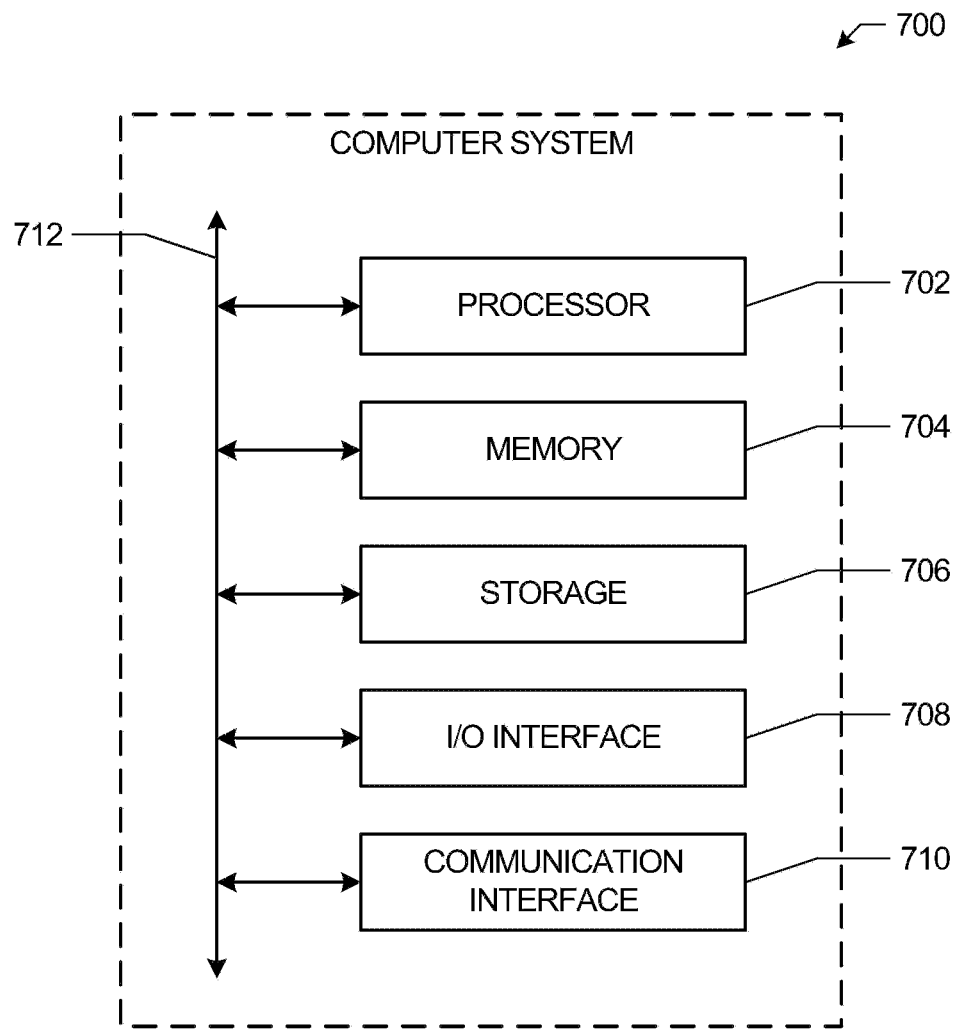
FIG. 7 illustrates an example computer system.

FIG. 7 illustrates an example computer system 700 that may be utilized to perform segmentation of movement repetitions and extraction of performance metrics in real-time with low-latency feedback, in accordance with the presently disclosed embodiments. In particular embodiments, one or more computer systems 700 perform one or more steps of one or more methods described or illustrated herein. In particular embodiments, one or more computer systems provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks.

Where appropriate, one or more computer systems 700 may perform without substantial spatial or temporal limitation one or more steps of one or more methods described or illustrated herein. As an example, and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement. In particular embodiments, processor 702 includes hardware for executing instructions, such as those making up a computer program. As an example, and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example, and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702.

Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example, and not by way of limitation, computer system 700 may load instructions from storage 706 or another source (such as, for example, another computer system 700) to memory 704. Processor may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage or elsewhere).

One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memory devices 704, where appropriate. Although this disclosure describes and illustrates particular memory, this disclosure contemplates any suitable memory.

In particular embodiments, storage 706 includes mass storage for data or instructions. As an example, and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 706 for them. Where appropriate, I/O interface 708 may include one or more device or software drivers enabling processor 702 to drive one or more of these I/O devices. I/O interface 708 may include one or more I/O interfaces 706, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example, and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it.

As an example, and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example, and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an electronic device:
   receiving a digital input indicating a type of movement;
   accessing, from one or more sensors of one or more wearable devices on a first user, streaming sensor data corresponding to movements of the first user and comprising velocity data;
   generating, based on the streaming sensor data and the indicated type of movement, displacement data corresponding to the movements of the first user;
   segmenting the displacement data into a plurality of segments based on time, each segment comprising a temporally contiguous sequence of displacement data, according to a match between each respective sequence of displacement data and a predetermined movement signature identifying an amount of displacement as a function of time, wherein at least one first segment of the plurality of segments comprises a plurality of displacements events comprising:
      a first identified single displacement event comprising a first movement, determined from the velocity data, over a first period of time and having a first identified start time and a first identified end time that is after the first identified start time; and
      a second identified single displacement event comprising a second predetermined movement, determined from the velocity data, over a second period of time having a second identified start time and a second identified end time that is after the second identified start time, and wherein the first segment comprising the plurality of displacement events is labelled as a single repetition of the particular predetermined movement;
   encoding the first identified single displacement event with the first identified start time, the first identified end time, and a total amount of displacement over the first period of time;
   encoding the second identified single displacement event with the second identified start time, the second identified end time, and a total amount of displacement over the second period of time;
   determining, for each repetition of the particular predetermined movement and based on the encoding of the first identified single displacement event and the encoding of the second identified single displacement event, a start time and an end time of that repetition, wherein the start time and end time of that repetition includes the first identified start time, the first identified end time, the second identified start time, and the second identified end time;
   calculating one or more performance metrics for one or more of the identified repetitions; and
   providing instructions for presenting a user interface comprising information referencing one or more of the performance metrics.

2. The method of claim 1, further comprising:
generating fused sensor data by combining components of the streaming sensor data, wherein the streaming sensor data comprises data from two or more of an accelerometer, a magnetometer, or a gyroscope, and wherein the fused sensor data comprises linear acceleration data; and
generating the velocity data by integrating the linear acceleration data;
wherein the displacement data is generated using the velocity data.

3. The method of claim 2, wherein generating the displacement data corresponding to the movements of the first user comprises:
identifying one or more position displacements indicated by the velocity data;
calculating a corresponding displacement value for each of the one or more position displacements; and
determining one or more of the plurality of displacement events based on the corresponding displacement values for the one or more positions displacements, wherein the displacement data comprises information corresponding to the one or more of the plurality of displacement events, and wherein the predetermined movement signature is characterized by a sequence of particular displacement events that correspond to a single repetition of the type of movement.

4. The method of claim 1, further comprising:
selecting a coordinate system from a predetermined set of coordinate systems based on the type of movement; and
wherein the displacement data is generated using the selected coordinate system.

5. The method of claim 1, further comprising:
calibrating the streaming sensor data by correcting for one or more of bias, noise, or scale factors; and
filtering the streaming sensor data by applying one or more of a high-pass filter, a low-pass filter, or a band-pass filter.

6. The method of claim 1, wherein the electronic device is one of the wearable devices of the first user.

7. The method of claim 1, wherein one or more of the one or more performance metrics is calculated less than 100 milliseconds after a completion of a first repetition of the one or more identified repetitions.

8. An electronic device comprising:
one or more non-transitory computer-readable storage media including instructions; and
one or more processors coupled to the storage media, the one or more processors configured to execute the instructions to:
receive a digital input indicating a type of movement;
access, from one or more sensors of one or more wearable devices on a first user, streaming sensor data corresponding to movements of the first;
determine, from the accessed streaming sensor data, velocity data corresponding to the movements of the first user;
generate, based on the velocity data and the indicated type of movement, displacement data corresponding to the movements of the first user;
segment the displacement data into a plurality of segments based on time, each segment comprising a temporally contiguous sequence of displacement data, according to a match between each respective sequence of displacement data and a predetermined movement signature identifying an amount of displacement as a function of time, wherein at least one first segment of the plurality of segments comprises a plurality of displacements events comprising:
a first identified single displacement event comprising a first predetermined movement, determined from the velocity data, over a first period of time and having a first identified start time and a first identified end time that is after the first identified start time and; and
a second identified single displacement event comprising a second predetermined movement, determined from the velocity data, over a second period of time having a second identified start time and a second identified end time that is after the second identified start time, and wherein the first segment comprising the plurality of displacement events is labelled as a single repetition of the particular predetermined movement;
encode the first identified single displacement event with the first identified start time, the first identified end time, and a total amount of displacement over the first period of time;
encode the second identified single displacement event with the second identified start time, the second identified end time, and a total amount of displacement over the second period of time;
determine, for each repetition of the particular predetermined movement and based on the encoding of the first identified single displacement event and the encoding of the second identified single displacement event, a start time and an end time of that repetition, wherein the start time and end time of that repetition includes the first identified start time, the first identified end time, the second identified start time, and the second identified end time;
calculate one or more performance metrics for one or more of the identified repetitions; and
provide instructions for presenting a user interface comprising information referencing one or more of the performance metrics.

9. The electronic device of claim 8, wherein the processors are further configured to execute the instructions to:
generate fused sensor data by combining components of the streaming sensor data, wherein the streaming sensor data comprises data from two or more of an accelerometer, a magnetometer, or a gyroscope, and wherein the fused sensor data comprises linear acceleration data; and
generate the velocity data by integrating the linear acceleration data;
wherein the displacement data is generated using the velocity data.

10. The electronic device of claim 9, wherein the processors are further configured to execute the instructions to generate the displacement data corresponding to the movements of the first user by:
identifying one or more position displacements indicated by the velocity data;
calculating a corresponding displacement value for each of the one or more position displacements; and
determining one or more of the plurality of displacement events based on the corresponding displacement values for the one or more positions displacements, wherein the displacement data comprises information corresponding to the one or more of the plurality of displacement events, and wherein the predetermined movement signature is characterized by a sequence of particular displacement events that correspond to a single repetition of the type of movement.

11. The electronic device of claim 8, wherein the processors are further configured to execute the instructions to:
select a coordinate system from a predetermined set of coordinate systems based on the type of movement; and
wherein the displacement data is generated using the selected coordinate system.

12. The electronic device of claim 8, wherein the processors are further configured to execute the instructions to:
calibrate the streaming sensor data by correcting for one or more of bias, noise, or scale factors; and
filter the streaming sensor data by applying one or more of a high-pass filter, a low-pass filter, or a band-pass filter.

13. The electronic device of claim 8, wherein the electronic device is one of the wearable devices of the first user.

14. The electronic device of claim 8, wherein the processors are further configured to execute the instructions to:
calculate one or more of the one or more performance metrics less than 100 milliseconds after a completion of a first repetition of the one or more identified repetitions.

15. A computer-readable non-transitory storage media comprising instructions executable by a processor to:
receive a digital input indicating a type of movement;
access, from one or more sensors of one or more wearable devices on a first user, streaming sensor data corresponding to movements of the first user;
determine, from the accessed streaming sensor data, velocity data corresponding to the movements of the first user;
generate, based on the velocity data and the indicated type of movement, displacement data corresponding to the movements of the first user;
segment the displacement data into a plurality of segments based on time, each segment comprising a temporally contiguous sequence of displacement data, according to a match between each respective sequence of displacement data and a predetermined movement signature identifying an amount of displacement as a function of time, wherein at least one first segment of the plurality of segments comprises a plurality of displacements events comprising:
a first identified single displacement event comprising a first predetermined movement, determined from the velocity data, over a first period of time and having a first identified start time and a first identified end time that is after the first identified start time and;
a second identified single displacement event comprising a second predetermined movement, determined from the velocity data, over a second period of time having a second identified start time and a second identified end time that is after the second identified start time, and wherein the first segment comprising the plurality of displacement events is labelled as a single repetition of the particular predetermined movement;
encode the first identified single displacement event with the first identified start time, the first identified end time, and a total amount of displacement over the first period of time;
encode the second identified single displacement event with the second identified start time, the second identified end time, and a total amount of displacement over the second period of time;
determine, for each repetition of the particular predetermined movement and based on the encoding of the first identified single displacement event and the encoding of the second identified single displacement event, a start time and an end time of that repetition, wherein the start time and end time of that repetition includes the first identified start time, the first identified end time, the second identified start time, and the second identified end time;
calculate one or more performance metrics for one or more of the identified repetitions; and
provide instructions for presenting a user interface comprising information referencing one or more of the performance metrics.

16. The media of claim 15, wherein the instructions are further executable by the processor to:
generate fused sensor data by combining components of the streaming sensor data, wherein the streaming sensor data comprises data from two or more of an accelerometer, a magnetometer, or a gyroscope, and wherein the fused sensor data comprises linear acceleration data; and
generate the velocity data by integrating the linear acceleration data;
wherein the displacement data is generated using the velocity data.

17. The media of claim 16, wherein the instructions are further executable by the processor to generate the displacement data corresponding to the movements of the first user by:
identifying one or more position displacements indicated by the velocity data;
calculating a corresponding displacement value for each of the one or more position displacements; and
determining one or more of the plurality of displacement events based on the corresponding displacement values for the one or more positions displacements, wherein the displacement data comprises information corresponding to the one or more of the plurality of displacement events, and wherein the predetermined movement signature is characterized by a sequence of particular displacement events that correspond to a single repetition of the type of movement.

18. The media of claim 15, wherein the instructions are further executable by the processor to:
calibrate the streaming sensor data by correcting for one or more of bias, noise, or scale factors; and
filter the streaming sensor data by applying one or more of a high-pass filter, a low-pass filter, or a band-pass filter.

19. The media of claim 15, wherein the electronic device is one of the wearable devices of the first user.

20. The media of claim 15, wherein the instructions are further executable by the processor to:
calculate one or more of the one or more performance metrics less than 100 milliseconds after a completion of a first repetition of the one or more identified repetitions.

* * * * *